United States Patent
Kakouros et al.

(10) Patent No.: US 7,584,116 B2
(45) Date of Patent: Sep. 1, 2009

(54) MONITORING A DEMAND FORECASTING PROCESS

(75) Inventors: Steve Kakouros, Grenoble (FR); Dorothea Kuettner, Menlo Park, CA (US); Marguerita Sasser, San Jose, CA (US); Nicole Smith, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1231 days.

(21) Appl. No.: 10/287,248

(22) Filed: Nov. 4, 2002

(65) Prior Publication Data

US 2004/0088211 A1    May 6, 2004

(51) Int. Cl.
*G06F 17/30* (2006.01)
(52) U.S. Cl. ...................................... 705/10
(58) Field of Classification Search ............... 705/10
See application file for complete search history.

(56) References Cited

U.S. PATENT DOCUMENTS

| | | | |
|---|---|---|---|
| 5,659,593 A | 8/1997 | Tzvieli | |
| 5,953,707 A | 9/1999 | Huang et al. | |
| 5,963,919 A | 10/1999 | Brinkley et al. | |
| 6,430,540 B1 | 8/2002 | Guidice et al. | |
| 6,606,615 B1 * | 8/2003 | Jennings et al. | 706/45 |
| 7,072,863 B1 * | 7/2006 | Phillips et al. | 705/36 R |
| 7,080,026 B2 * | 7/2006 | Singh et al. | 705/10 |
| 7,406,435 B2 * | 7/2008 | Aronowich et al. | 705/10 |

OTHER PUBLICATIONS

Barefield "A Model of Forecast Biasing Behavior", Jul. 1990, The accounting review, pp. 490-501.*
Riley "Pension Fund Investment", Mar. 1997, Financial Times, Survey London Edition 2 ED, pp. 1-3.*
Kwag et al "Bias Analysis'Earnings Forecasts", Jan. 2002, The University of Tennessee, pp. 1-36.*
Goodin (Forecasting cattle prices in the presence of structural change), Dec. 1992, Southern journal of agricultural economics, pp. 1-12.*
Syntetos et al (On the bias intermittent demand estimates), May 2001, International journal of production economics, vol. 71, pp. 1-16.*
Cho et al (Forecaster Characteristics and Forecast) ournal of economics and business, pp. 1-10.*
Steve Kakouros et al Measure Then Manage APICS journal of the American Production and Inventory Control Society (Oct. 2002).

* cited by examiner

*Primary Examiner*—Romain Jeanty

(57) ABSTRACT

Systems and methods of monitoring a demand forecasting process are described. In accordance with a demand forecasting monitoring method, a measure of forecast error variability is computed at each period of a selected time frame, and an indicator of forecast bias is computed at a given period within the selected time frame based on forecast error consistency over periods of the selected time frame prior to the given period. A computer program for implementing the demand forecasting monitoring method is described. A system for monitoring a demand forecasting process that includes a graphical user interface configured to display a measure of standard deviation of percent forecast error at each period of a selected time frame also is described.

27 Claims, 11 Drawing Sheets

|  | | | Forecast Error Variability Over Acceptance Limits? | |
|---|---|---|---|---|
|  | | | No | Yes |
| Forecast Quality | No Bias | In Control | Good | At Risk |
|  | No Bias | Out of Control | Good | At Risk |
|  | Bias | In Control | At Risk | Critical |
|  | Bias | Out of Control | Critical | Critical |

Metrics by Base Product for Period: 200209 /78

| Platform | Product Name | Product # | A | F | (F-A)/A | SD FE | out of control | biased |
|---|---|---|---|---|---|---|---|---|
| ACCESSORY | DUPLEXOR ACCESSORY | C6437A | 750 | 120 | 525% | 327% | 0 | 0 |
| ACCESSORY | 1285 LIO CARD ACCESSORY | C6502A | 1,000 | 137 | 630% | 190% | 0 | 0 |
| ACCESSORY | GROMIT PAPER TRAY | C7310A | 450 | 77 | 484% | 76% | 1 | 1 |
| ANTARES | ANTARES | C8416A | 45,310 | 29,275 | 55% | 23% | 0 | 0 |
| ANTARES | ANTARES V40XI | C8417A | 21,930 | 8,866 | 147% | 113% | 0 | 1 |
| AVALON | AVALON FAX | C6737A | 19,960 | 6,051 | 230% | 64% | 0 | 1 |
| AVALON | OJ G85XI | C6739A | 4,500 | 2,618 | 72% | 38% | 0 | 0 |
| BANZAI | BANZAI LO | C8648A | 121,045 | 64,331 | 89% | 0% | 0 | 0 |
| BANZAI | BANZAI LO | C8649A | 23,760 | 14,095 | 69% | 0% | 0 | 0 |
| BANZAI | BANZAI LO | C8650A | 15,840 | 4,662 | 240% | 0% | 0 | 0 |
| BANZAI | BANZAI HI | C8658A | 113,068 | 84,712 | 33% | 0% | 0 | 0 |
| BANZAI | BANZAI HI | C8659A | 23,958 | 7,574 | 216% | 0% | 0 | 0 |
| BANZAI | BANZAI HI | C8660A | 8,712 | 455 | 1815% | 0% | 0 | 0 |
| BART | BART | C8426A | 77,355 | 48,980 | 58% | 32% | 0 | 0 |
| BART | BART PSC 750XI | C8427A | 11,413 | 16,315 | -30% | 80% | 0 | 0 |
| BART | BART COPIER | C8431A | 5,790 | 2,121 | 173% | 43% | 0 | 0 |
| DRAGNET | DRAGNET FAX 1020 | C8580A | 18,200 | 12,021 | 51% | 17% | 0 | 0 |
| DRAGNET | DRAGNET FAX 1020XI | C8581A | 200 | 226 | -12% | 376% | 0 | 0 |
| DRAGNET | DRAGNET FAX 1020 CA ENG | C8583A | 1,418 | 783 | 81% | 31% | 0 | 0 |
| DRAGNET | DRAGNET FAX 1020 CA FR | C8584A | 128 | 32 | 300% | 80% | 0 | 0 |
| GROMIT | COLOR COPIER 610 | C8372A | 6,484 | 1,441 | 350% | 98% | 0 | 0 |
| GROMIT | GROMIT 3:1 | C8373A | 1,613 | 23500% | 586% | 270% | 0 | 1 |
| GROMIT | GROMIT BASE | C8374A | 1 | 147 | -99% | 140% | 0 | 0 |
| GROMIT | HP OFFICEJET D135 | C8375A | 37600 | 11,060 | 240% | 16% | 1 | 1 |
| GROMIT | GROMIT MIDAPHOTO | C8376A | 6,072 | 4,522 | 34% | 34% | 0 | 0 |
| GROMIT | HP OFFICEJET D145 | C8377A | 18,204 | 5,660 | 222% | 19% | 1 | 0 |
| GROMIT | HP OFFICEJET D155XI | C8378A | 6,380 | 830 | 669% | 190% | 0 | 0 |
| ORION | OJ K80 | C6750A | 26,420 | 9,395 | 181% | 35% | 0 | 1 |
| ORION | OJ K80XI | C6751A | 9,050 | 12,941 | -30% | 45% | 0 | 0 |
| ORION | ORION FAX 1220 | C8461A | 2,877 | 3,440 | -16% | 9% | 0 | 0 |
| ORION | ORION FAX 1220XI | C8462A | 1,025 | 1,007 | 2% | 7% | 0 | 0 |

FIG. 12

Metrics by Platform for Period: 200209                                /80

| Platform | F | A | (F-A)/A | SD FE | out of control | biased |
|---|---|---|---|---|---|---|
| ACCESSORY | 2,200 | 334 | 559% | 210% | 0 | 0 |
| ANTARES | 67,240 | 38,141 | 76% | 31% | 0 | 0 |
| AVALON | 24,460 | 8,669 | 182% | 56% | 0 | 1 |
| BANZAI | 306,383 | 175,829 | 74% | 0% |  | 0 |
| BART | 94,558 | 67,416 | 40% | 9% | 1 | 1 |
| DRAGNET | 19,946 | 13,062 | 53% | 21% | 0 | 1 |
| GROMIT | 76,354 | 23,895 | 220% | 26% | 1 | 1 |
| ORION | 39,372 | 26,783 | 47% | 26% | 0 | 1 |

Select Product

Aggregated level

| Platform |
|---|
| ACCESSORY |
| ANTARES |
| AVALON |
| BANZAI |
| BART |
| DRAGNET |

Product level

| Platform | Product Name |
|---|---|
| ACCESSORY | DUPLEXOR ACCESSORY |
| ACCESSORY | 1285 LIO CARD ACCESSORY |
| ACCESSORY | GROMIT PAPER TRAY |
| ANTARES | ANTARES |
| ANTARES | ANTARES V40XI |
| AVALON | AVALON FAX |

Overview Tab

FIG. 14

MONITORING A DEMAND FORECASTING PROCESS

TECHNICAL FIELD

This invention relates to systems and methods of monitoring a demand forecasting process.

BACKGROUND

Asset managers of large manufacturing enterprises, for example, computer manufacturers, electronics manufacturers and auto manufacturers, must determine the inventory levels of components and finished products that are needed to meet target end customer service levels (i.e., the fraction of customer orders that should be received by the requested delivery dates). For such manufacturing enterprises, the delivery of a finished product to an end customer typically involves a complex network of suppliers, fabrication sites, assembly locations, distribution centers and customer locations through which components and products flow. This network may be modeled as a supply chain that includes all significant entities participating in the transformation of raw materials or basic components into the finished products that ultimately are delivered to the end customer.

Business entities use demand forecasting techniques to plan the correct quantity of goods to be manufactured to meet customer needs. If the demand forecast is significantly different from the actual demand, there is an increase in the cost structure of the company. For example, when too much demand is forecasted, too many units will be manufactured, which leaves finished goods in inventory. Growing inventories lead to higher storage and maintenance costs. Business entities that do a better job of forecasting have significantly better control over their inventories and customer service levels.

Mathematical forecasting tools have been developed to increase the accuracy of demand forecasts. Many of these mathematical tools combine historical demand data with statistical analyses to determine a likely predicted value of demand for a product. In general, these forecasting techniques analyze the statistical patterns in historical demand data to predict future demand. Among these demand forecasting methods are: moving average techniques; exponential smoothing techniques; Box-Jenkins techniques; and multivariate regression techniques. Demand forecasting accuracy also is improved by applying human judgment to the predictions of the demand forecasting models. Forecasters validate the forecasts generated by the mathematical models and adjust the forecasts to accommodate events that are not incorporated into these models.

SUMMARY

The invention features systems and methods of monitoring a demand forecasting process.

In one aspect, the invention features a demand forecasting monitoring method in accordance with which, a measure of forecast error variability is computed at each period of a selected time frame, and an indicator of forecast bias is computed at a given period within the selected time frame based on forecast error consistency over periods of the selected time frame prior to the given period.

The invention also features a computer program for implementing the above-described demand forecasting monitoring method.

In another aspect, the invention features a system for monitoring a demand forecasting process that includes a graphical user interface configured to display a measure of standard deviation of percent forecast error at each period of a selected time frame.

Other features and advantages of the invention will become apparent from the following description, including the drawings and the claims.

DESCRIPTION OF DRAWINGS

FIG. 12 is an overview table containing values for multiple forecast evaluation metrics for multiple products.

FIG. 13 is an overview table containing values for evaluation metrics aggregated along multiple product lines.

FIG. 14 is a graphical user interface through which a user may select the way in which forecast data is to be aggregated and filtered by the metrics calculation engine of FIG. 2.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

1 Overview

In high technology businesses, a popular piece of current wisdom says that "forecasts are always wrong." This is slightly misleading, since it seems to blame the forecasting process rather than the inherent variability of the consumer electronics and computer systems business. However, it is certainly true that we cannot treat forecasts as "known" information and base our operations on it without planning for deviations (forecast errors). The embodiments described below suggest an alternative motto: "measure, then correct," whereby we measure the accuracy of demand forecasts and then make appropriate adjustments to the forecasts. A standardized set of metrics is provided that works consistently over a variety of products and life cycles. Measuring exactly where each forecast is off, and assessing the magnitude of these errors improves the ability to manage uncertainty, improves the forecasting process, and optimizes asset utilization. By maintaining and improving forecast accuracy forecasters and production planners can make appropriate supply chain decisions.

1.1 Process Overview

Figure 1:
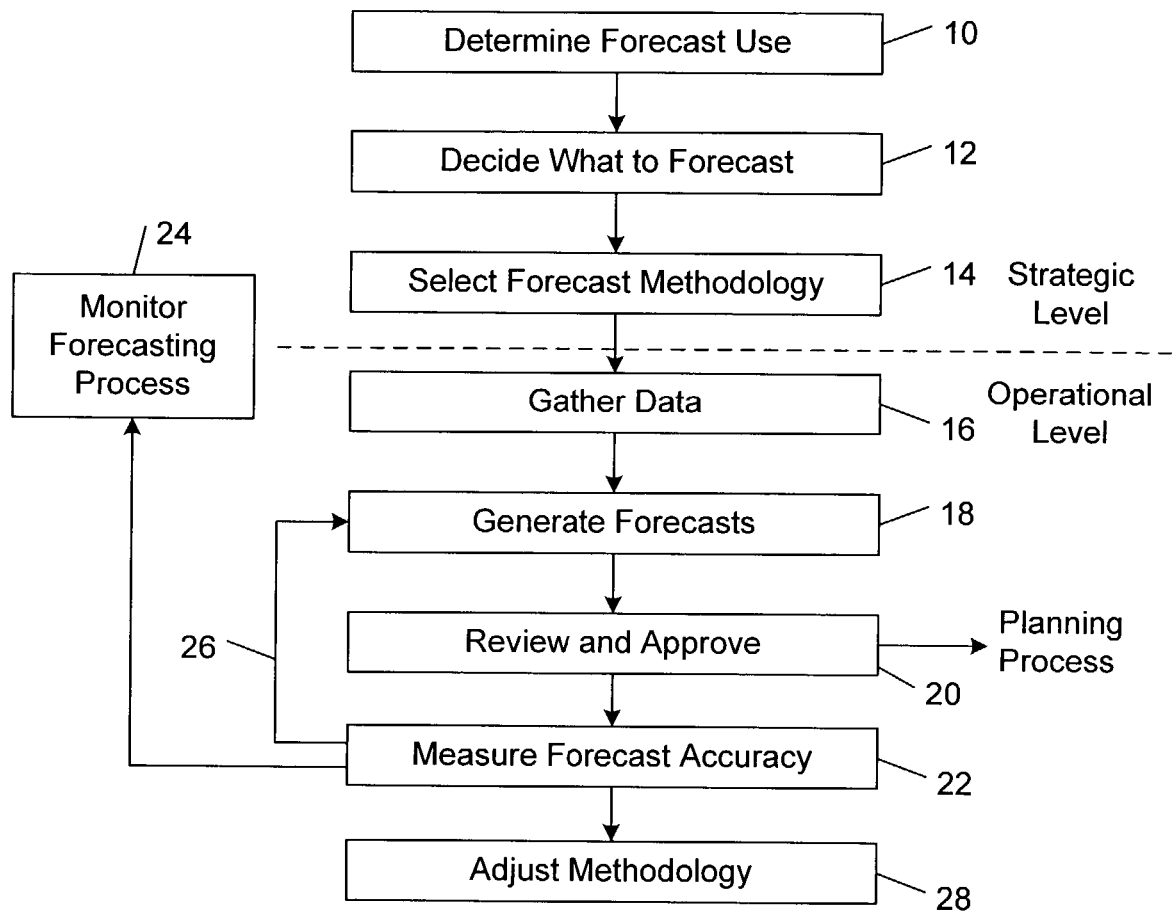
FIG. 1 is a flow diagram of a demand forecasting process.

Referring to FIG. 1, in some embodiments, a demand forecasting process may be implemented as follows. We review it from the top down, starting at the strategic planning level. Strategic forecast planning is done at a high level, for an aggregation such as an entire product line or region. This is also the level at which forecast audits occur. The strategic level determines how the forecast will be used because the question of which forecasting methodology is most appropriate cannot be answered until the forecasting problem is properly defined (step 10). Once it is clear how the forecast will be used (step 10) and what is being forecasted (step 12), we can select the appropriate forecasting methodology (step 14). Forecasting on the operational level is the execution of the selected strategy and will generate the actual forecast for individual products. The strategic level of forecast planning can be triggered by special events such as the introduction of a completely new type of product—or, in the case of forecast audits, an audit can be triggered if the forecast portfolio metrics seem to indicate problems with forecast accuracy that are sufficiently widespread or severe to require immediate high-level corrective action.

The phases of strategic level forecasting are as follows:

a) Determine uses of forecast (step 10). This step typically involves identifying who owns the forecast, who will use the forecast, and what sort of planning activities they will use it for (for example, production, marketing, or revenue).

b) Decide what to forecast (step 12). This step typically includes choosing the data stream to forecast (for example, orders, sell-through, revenue), and the level of aggregation at which to present the data. The forecast horizon (for example, product life or product lead time) and the expected level of accuracy that the forecasts should achieve also should be determined.

c) Select forecasting methodology (step 14). This step typically involves selecting an approach, algorithms, and forecasting packages that are appropriate to the forecasting needs.

The overall health of the forecasting process should be periodically assessed through strategic-level forecast evaluation using the process and metrics described in detail below. A strategic-level forecast audit may be performed, for example, two or more times per year. Some businesses may perform a strategic-level forecast audit more often than others.

The detail (or operational) level forecasting cycle may occur more frequently than the strategic level forecasting cycles. For long-term forecasts (5 years out), operational-level forecasting might be performed quarterly. For midterm forecasts (0 to 18 months) operational-level forecasting might be performed monthly. The operational-level forecasting even might be performed weekly for very short-term forecasts (0-12 weeks).

The activities that occur during detail level forecasting are:

a) Data gathering (step 16). For example, get the data into the software, properly formatted and complete.

b) Forecast generation (step 18). Run the algorithms to generate detailed product forecasts, including soft factors.

c) Forecast review and approval (step 20). Forecasters meet with representatives from finance, product planning, etc., to review anticipated market share and growth expectations.

d) Forecast assessment (step 22). Individual forecasters evaluate the accuracy of the forecasts for which they are responsible against actuals data on an ongoing basis using a set of meaningful and actionable metrics, such as those described in detail below. Summarized results of the forecast evaluations run on individual forecasts may be generated for manager review (step 24).

e) Adjust and refine individual forecasts (step 26). Forecasters can adjust their forecasts appropriately using the output from the forecast metrics.

f) Adjust and refine the forecasting process if needed (step 28). Managers and forecasting groups review high-level output from the forecasting metrics to determine when to adjust algorithm parameters and/or modify forecasting methods to improve future performance. If only a handful of forecasts are out of balance, the forecasters should be able to address this. However, if a pattern emerges among all the forecasts, the forecasting process itself may need modification.

Metrics Support Forecast Evaluation

The usual method of correcting a forecast tends to overemphasize the "noise" caused by a certain inevitable amount of variability in the actuals. That, combined with a short-term historical view, may lead to a sort of "chasing one's own tail" where each month's revised forecast over-corrects for the errors from the previous month.

Demand fluctuations are unavoidable, but they may be corrected using statistical methods. We have devised metrics that allow us to measure the accuracy of our forecast with greater confidence than just going from one period to the next. We propose separate sets of forecast metrics for monitoring the strategic level and operational level forecasting processes (step 24). Operational-level forecast metrics serve as the foundation for the forecast evaluation process on both operational and strategic levels. The operational-level forecast metrics show, for each product, the percent by which the forecast is in error, whether the forecasts have been consistently in error over several consecutive periods, and whether the magnitude of the forecast error as seen over time is sufficient to warrant immediate attention for that product. They are actionable in that they help forecasters detect the possible causes of forecast error (such as forecast bias).

In some embodiments, during each forecasting cycle, forecasters evaluate the performance of the forecasting process as follows (step 24):

a) Apply the forecast metrics to the forecasts generated for the current period.

b) Review a portfolio-level metrics report to get a first indication of the general state of current forecast performance and how it compares to past performance. Use rollup data consisting of aggregated results of the operational metrics as applied to individual product forecasts.

c) Review the overview table to determine if there are any major problem areas common across many forecasts. (The forecasters can address isolated problems). Major problems should be further investigated.

d) Isolate and correct systemic problems in the forecasting process.

e) Investigate individual forecasts where problems occur.

1.2 The "4M" Forecast Evaluation Process

The usual method of correcting a forecast tends to over-emphasize the "noise" caused by a certain inevitable amount of variability in the actuals. That, combined with a short-term historical view, can lead to a sort of "chasing one's own tail" where each month's revised forecast over-corrects for the errors from the previous month. Demand fluctuations are unavoidable, but they can be corrected for using statistical methods.

To this end, in some embodiments, a set of four metrics are used to measure the accuracy of our forecast with greater confidence than just going from one period to the next. This method is referred to herein as the "4M" forecast evaluation process because it uses four metrics. The metric set consists of the following measures:

Percent error: Shows percentage by which the forecast was off, rather than actual units.

Standard deviation of the percent error: Compares forecasted with actual values, and shows standard deviation of forecasting errors.

Error control: Determines whether forecasting errors fall within defined allowable limits.

Bias indicator: Indicates whether there is a bias, positive or negative, in forecasting errors.

Figure 2:
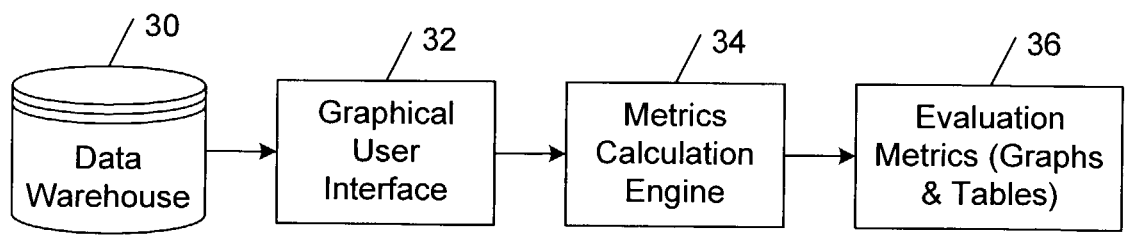
FIG. 2 is a diagrammatic view of a demand forecasting monitoring system, including a data warehouse, a graphical user interface, and a metrics calculation engine that is operable to compute one or more evaluation metrics.

Referring to FIG. 2, in some embodiments, the evaluation metrics are computed as follows. Data is selected from a data warehouse 30 by a user using a graphical user interface 32. The selected data is fed into a metrics calculation engine 34, which reports the evaluation metrics 36 in the form of one or more graphs and tables. Metrics calculation engine 34 may be implemented as one or more respective software modules operating on a computer. In one embodiment, the metrics calculation engine 34 may be implemented as a Microsoft® Access® Database utilizing Visual Basic® for Applications (VBA) computer program that is operable as a spreadsheet tool in the Microsoft® Excel® application program, which is operable on a personal computer or a workstation. APPENDICES A, B, C, and D respectively contain the logic flow, the Excel® code, the corresponding Microsoft® Access® database code, and the functions for one implementation of metrics calculation engine 34.

In general, a computer (or workstation) on which metrics calculation engine 34 may execute includes a processing unit, a system memory, and a system bus that couples the processing unit to the various components of the computer. The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard and a mouse. Other input devices (e.g., a microphone, joystick, or touch pad) also may be provided. Information may be displayed to the user on a monitor. The computer also may include peripheral output devices, such as speakers and a printer. In addition, one or more remote computers may be connected to the computer over a local area network (LAN) or a wide area network (WAN) (e.g., the Internet).

Figure 3:
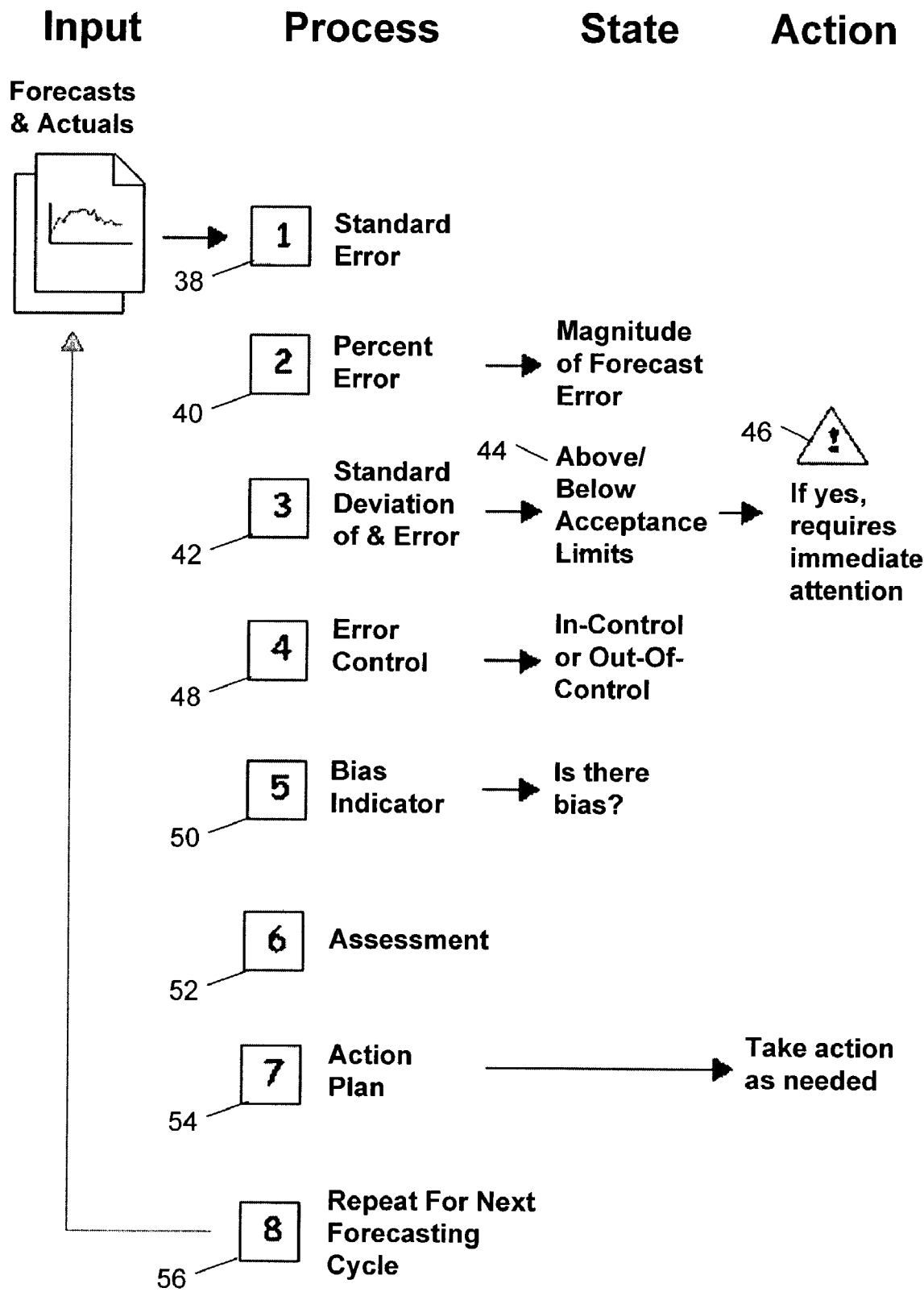
FIG. 3 is a diagrammatic view of a method of monitoring a demand forecasting process.
Figure 4:
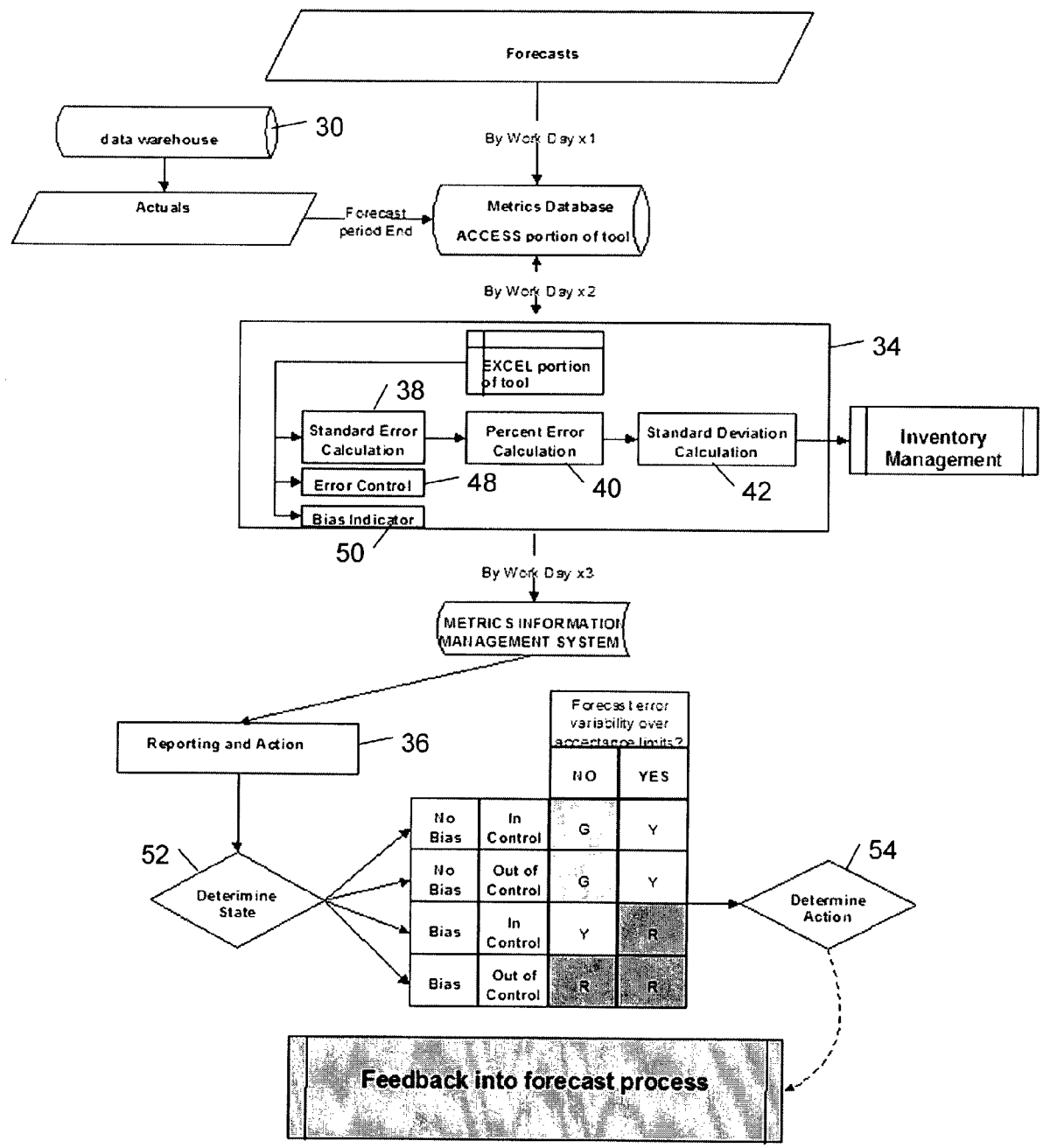
FIG. 4 is a diagrammatic view of data flow in the demand forecasting monitoring method of FIG. 3.

Referring to FIGS. 3 and 4, in some embodiments, the forecast metrics are incorporated into a forecast evaluation process as follows. The metrics are applied in order from the most simple to the most complex. Each metric measures a particular aspect of forecast accuracy. The overall "state" of the forecast is determined using the combined input of each of the metrics. Corrective actions are taken based on which state the forecast falls into. Although the states themselves are fairly unequivocal, there is a fair amount of subjectivity in areas such as when and whether to act upon them, and also in the setting of certain practical limits used within the metrics themselves.

The steps in the 4M forecast evaluation process are as follows. Compare last period's forecast with last period's actuals to generate a standard error chart (step 38). Convert the standard error chart into a percent error chart (step 40). Calculate the standard deviation for the percent error chart (step 42). If this is outside acceptance limits (step 44), immediate attention typically is required (step 46). Use the standard error chart to calculate the error control chart (step 48). Use the standard error chart to calculate the bias indicator chart (step 50). Use the results of steps 40-50 to determine the "state" of the forecast (step 52), as described below in Section 2.5. Based on the state of the forecast (step 52), formulate an appropriate plan for taking corrective action, if needed (step 54). Repeat this process again the following cycle (step 56). In some embodiments, the forecast evaluation process is performed every forecasting cycle. A forecasting period can be of any length—monthly, weekly, or even daily—with more frequent periods being useful for generating the historical data points that increase the accuracy of the evaluation metrics.

See Section 2 for a detailed description of each metric, and see Section 2.5, a more detailed description of how to use the 4M forecast evaluation process.

2 Metrics Overview

This section describes the four metrics, which are:

Percent error

Standard deviation of the percent error

Error control

Bias indicator

Section 2.2 describes the derivation of both the Percent Error and the Standard Deviation metrics. These charts are used as inputs to the other metrics. Section 2.3 describes how a forecast is measured as being "in control" or "out-of-control." Section 2.4 presents two metrics that may be used together to determine whether a forecast is biased. All these metrics typically are in a forecast evaluation process to best assess the quality of a forecast.

2.1 Statistical Requirements

All the metrics typically should be computed based on a certain minimum amount of historical data. Although we assume a monthly forecast cycle, it is the number of data points that is important, rather than the number of months. The general guidelines for achieving a stable demand forecasting monitoring process are as follows:

A minimum of 8 data points should be used for a stable system.

In cases where 8 data points are not available, the metrics may be used with as few as 5 data points.

Reporting typically is not done for systems with less than 5 data points because the numbers used to generate these statistical tests typically are not yet in a steady state.

Although the charts presented herein assume that the data points are based on a forecasting interval of months, other intervals are possible. For products with short life cycles, achieving full set of data points Metrics for Measuring Forecast Accuracy may require more frequent forecasting intervals than monthly.

2.2 Percent Error and Standard Deviation

The first step in the above-described forecasting evaluation process is to compare forecast with actual demand. In this regard, three types of charts are computed:

Standard error, which is not a forecast metric but is used to generate the other metrics.

Percent error, which is the standard error converted to a percentage measuring the magnitude of the forecast error relative to total volume of actuals.

Standard deviation of the percent error over a specified period of time (usually 8 months).

2.2.1 Standard Error

In some embodiments, the standard error is computed as follows:

$$Standard\ Error = Forecast - Actual$$

Actual refers to actual monthly demand, and is defined in these embodiments as the quantity sold at earliest accepted date (EAD). This gives a first estimation of the quality of the forecast. The (Forecast−Actual) formula used here deviates from the more widely used (Actual−Forecast) formula but is more meaningful for asset management, because the sign of the percent error follows the magnitude of the inventory error (shortage or excess). For example, suppose we forecasted 1000 units but only sold 800. Our over-forecasting results in 200 units of excess inventory. Using the traditional (Actual−Forecast), we end up with −200 to express an inventory excess, whereas with the (Forecast−Actual) formula, the sign of the result matches the fact that we have excess inventory rather than a shortage.

2.2.2 Percent Error

The percent error is measured as follows:

$$PercentError = \left(\frac{Forecast - Actual}{Actual}\right)$$

If the actual value is less than or equal to zero, we set actual as equal to one to calculate the percent error.

Figure 5:
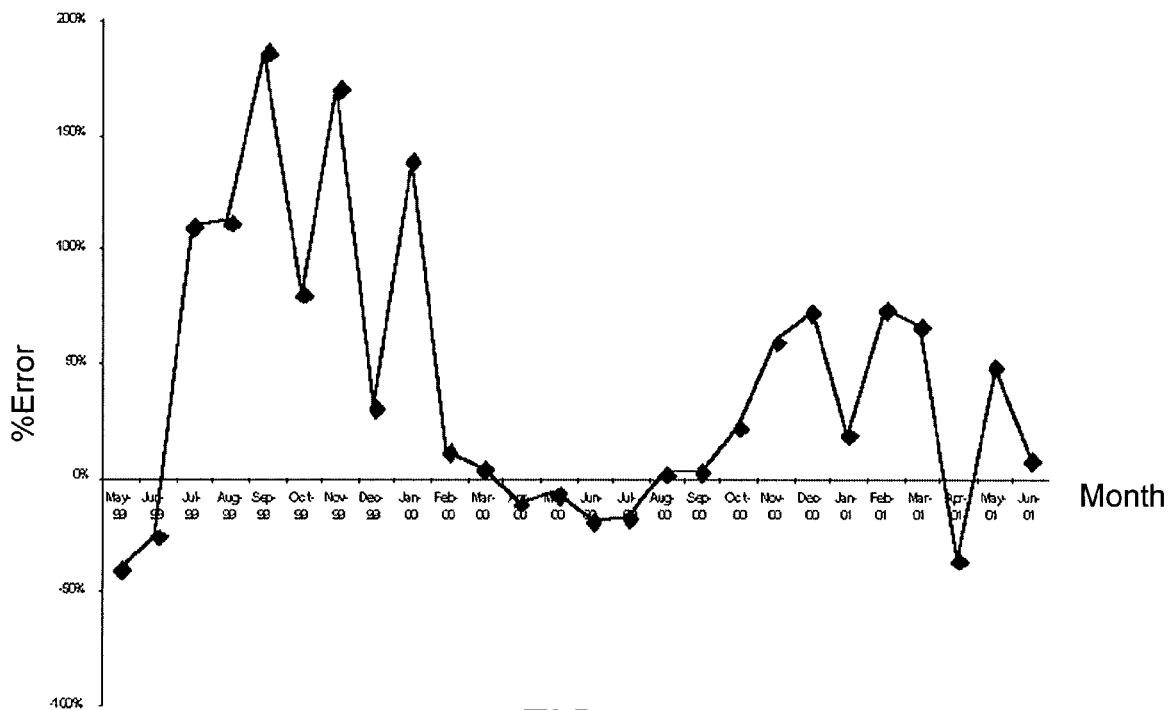
FIG. 5 is a graph of percent forecast error plotted as a function of time.

We use the percent error rather than the standard error (forecast−actual) in order to measure the error spread relative to actual demand, rather than a single number of how many units you were off by each time. As demand increases, the standard error is also likely to increase correspondingly; however this apparent increase may be misleading. Thus, the percent error metric provides a more unified way to compare forecasts for low- and high-volume products. For example, suppose we compare forecasts with actuals for two products, Product A and Product B. Product A is a low-volume product, while product B is a high volume product. Product A's forecast is for 1,000 units and actual is 900. Product B's forecast is 100,000 units and actuals are 90,000. The standard error appears to be much higher for product B (10,000) than for Product A (100). However, in actuality, the forecasting is off by minus 10% for each product. An exemplary percent error chart is shown in FIG. 5.

2.2.3 Standard Deviation of the Percent Error

Figure 6:
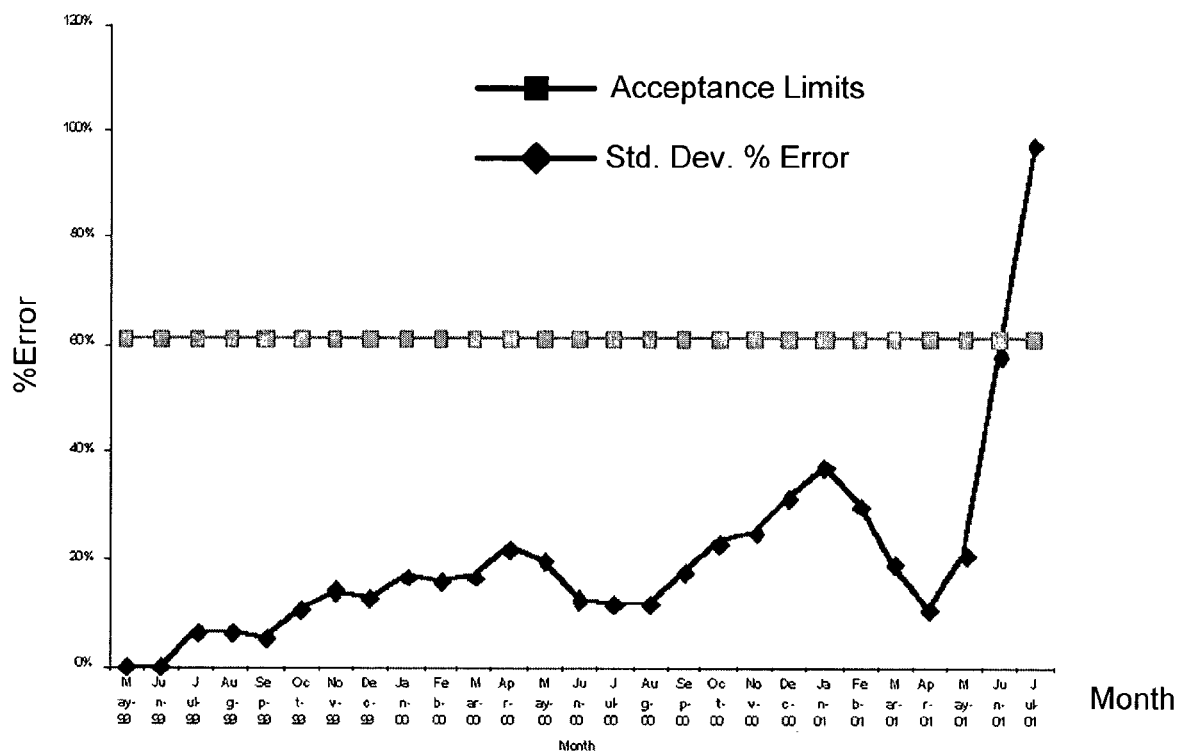
FIG. 6 is a graph of standard deviation in the percent forecast error plotted as a function of time.

Referring to FIG. 6, an exemplary chart for the standard deviation of the percent error contains a plot of an estimate of the standard deviation of the percent error, as well as a practical limit line for the specific forecast. This practical limit line sets the acceptable limits for the standard deviation of the percent error. Refer to APPENDIX E for a detailed explanation of the practical limit line. In the illustrated standard deviation in the percent error chart, the practical limit is set at 60%, meaning any standard deviation of the percent under 60% is considered within acceptance. Note the dramatic jump in May/June of 2001 was preceded by some nervousness starting around November of the previous year. This period may correspond to the point when the economy began to decline, for example.

In the illustrated embodiment, the standard deviation chart of FIG. 6 takes the percent error for the current period and each of the previous seven periods and calculates the standard deviation among all of these eight percent errors. In this particular example, the standard deviation uses eight months (observations) of demand data. A rolling history of eight months typically provides enough data points to give a reasonable estimate of the standard deviation, yet only evaluates the forecast based on recent performance. If the product hasn't been in existence for eight months, the entire product history may be used to estimate the standard deviation of percent error; however, in these cases it is typically desirable to have at least five months of data in order for the standard deviation to be meaningful.

2.2.3.1 Interquartile Spread

In the illustrated embodiment, the computation of the standard deviation of the percent error is modified as explained in APPENDIX F. This modification reduces the likelihood that the resulting computed standard deviations will be unduly influenced by outlying observations. In brief, in these embodiments, we use a more robust estimator called the interquartile spread, which is the difference between the 75th and 25th percentiles, multiplied by 0.74.

2.2.3.2 Interpreting the Standard Deviation Metric

The standard deviation of the percent error is a measure of the variability in our forecast errors. It is desirable to keep the standard deviation of these errors small, since this value drives the amount of safety stock that must be carried.

2.2.4 The Practical Limit Line

The practical limit line establishes a threshold below which some standard deviation is inevitable. It's essentially the boundary between signal and noise for this particular forecast metric. The placement of this line attempts to answer the ever-lingering question: How good is "good enough"? If the standard deviation of forecast error at the worldwide level is below this line, it is unlikely that the spread in our forecast errors could be reduced significantly through additional investment in forecasting.

The practical limit line is a mostly subjective criterion that varies from one forecaster to another. However, the practical limit line does provide the user with some idea of when further investment in forecasting improvements can be discontinued, at least as long as the current good forecasting performance is sustained.

See APPENDIX E for a discussion of the practical limit line.

2.3 Error Control Chart

The error control chart indicates whether forecasts are "in-control" relative to past performance. In the illustrated embodiments, "In-control" is an arbitrary limit that is calculated using historical errors within an 8-month rolling window.

2.3.1 Calculating The Error Control

Figure 7:
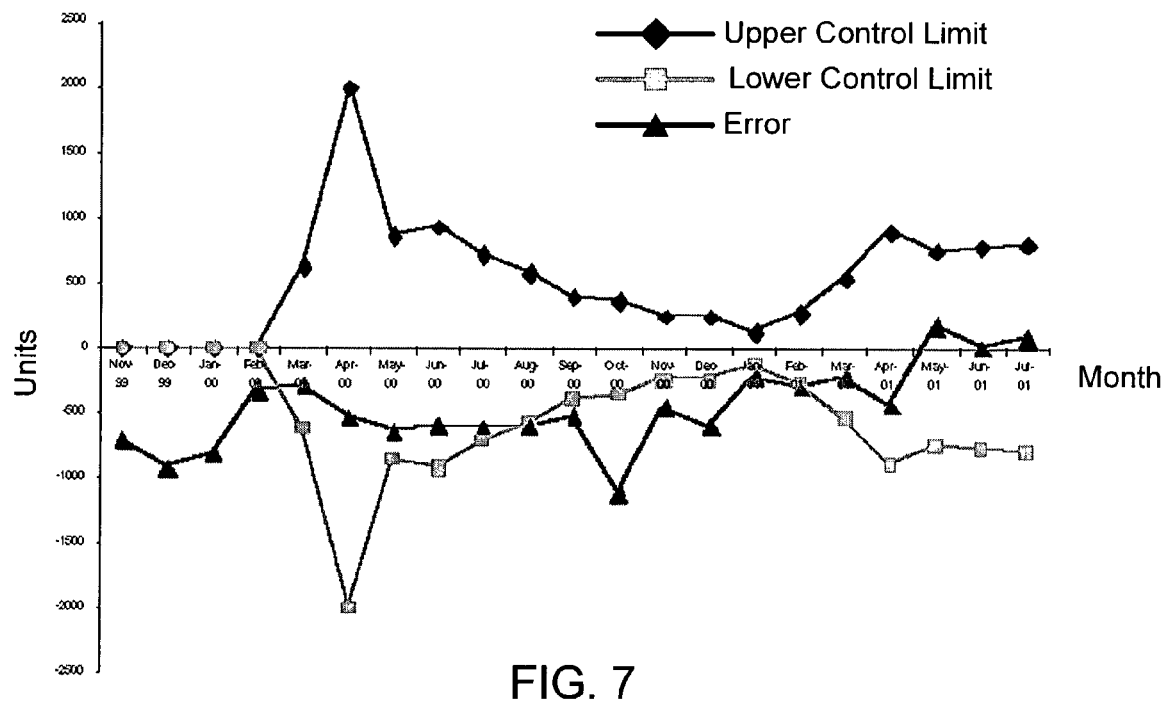
FIG. 7 contains graphs of standard error and upper and lower control limits of standard error plotted as a function of time.

As shown in FIG. 7, in some embodiments, an error control chart contains a plot of the standard forecast error (Forecast−Actual), rather than the percent error, because the standard error is measured in units. Knowing that we over-forecasted 10 units is more useful than knowing that we over-forecasted 20%, because we can mentally translate the units to a dollar value and act appropriately. In the illustrated example, we obviously would not put significant effort into correcting a 10-unit error, unless the units had an unusually high material value.

2.3.1.1 Rolling Window

In the illustrated embodiment, the control limits are calculated every month and are based on past forecast errors within an 8-month rolling window. As for the percent error chart (see Section 2.2.2), if the product has been in existence less than 9 months, the entire history is used. A rolling window avoids forever penalizing or rewarding forecasts for poor or exceptional past performance.

The control limits (and hence this chart) typically are not valid until we have a minimum of four months of data. This minimum quantity is somewhat arbitrarily set. In general, at least two observations are required before we can begin to estimate the standard deviation, and the more observations that are available, the more accurate the estimate.

2.3.1.2 Calculating Upper and Lower Control Limits

In some embodiments, the appropriate upper and lower control limit values are calculated using the standard deviation of the standard error, using the interquartile method as described in APPENDIX E. (Note that we are using the standard deviation of the standard error chart, not the standard deviation of the percent error.) In these embodiments, the upper and lower control limits are set a certain number of standard deviations from the zero error line. Setting the control limits at the zero error line rather than the median of the forecast errors, avoids biasing the forecasts (i.e., the median value of the errors should be zero). In general, we want the forecasting process to be in-control with zero bias.

In the illustrated embodiments, the t-distribution is used to determine the appropriate number of standard deviations at which to set the control limits so that the probability that an error falls within the control limits is equal to 95%. The appropriate number of standard deviations is a function of the sample size that is used to estimate the standard deviations. For example, for a sample size of 5 the control limits may be set at ±5.55 standard deviations from the zero error line, and for a sample size of 9±3.15 standard deviations may be used.

2.3.1.3 Outliers

At times we expect to see errors which lie outside our control limits. These errors are a sign that the forecasting process is most likely out-of-control and should be investigated. In the exemplary error control chart of FIG. 7, the forecasting process is out-of-control from September 2000 through January 2001, when the error exceeds the lower control limits. However, also note that the control limits for that time period are narrower than for the preceding and subsequent ones.

Outliners are classified into two types:

Random chance due to known variability in our process. Examples include demand spikes or economic downturns.

An event that will not be repeated in the future, such as a planned promotion.

In practice, it is not so easy to distinguish between these two types of outliers. For this reason, whether to choose to either include or exclude all outliers is a matter of design choice. In the illustrated embodiments, outliers are included.

2.3.2 Interpreting the Error Control Chart

Errors falling outside of the control limits indicate that the forecasting process for a specific product is "out of control" control relative to past performance, and typically should be investigated. Examples of reasons that a forecasting process may be out-of-control include:

Missing a big deal or promotion

Using a new connect rate for forecasting

2.3.2.1 Confidence Level

The control limits used in these examples are based on a confidence level of 95%. With a confidence level of 95%, an in-control forecasting process should have 95% of the errors within the control limits. If a forecast error falls outside of the control limits for that data period, then there is only a 5% probability that this was due to random chance. More likely, the forecasting process is out-of-control. Typically, the causes of these unusually large errors should be investigated and corrected.

2.3.2.2 More Caveats

Note that the error control chart evaluates the most recent forecast based on previous performance. It does not attempt to determine whether the previous performance was good or not. In some embodiments, the current forecast process is compared with other, simpler methods, such as a naïve method (e.g., a forecast for any period that equals the previous period's actual value).

2.4 Bias Indicator Chart

Bias occurs when a forecast is consistently higher or lower than actual demand. Inventory levels are set based on forecasts, and if the forecast is consistently biased, the inventory will always be either too high (positive bias) or too low (negative bias). Moreover, the inventory shortage or excess will worsen over time unless the forecast is corrected.

Figure 8:
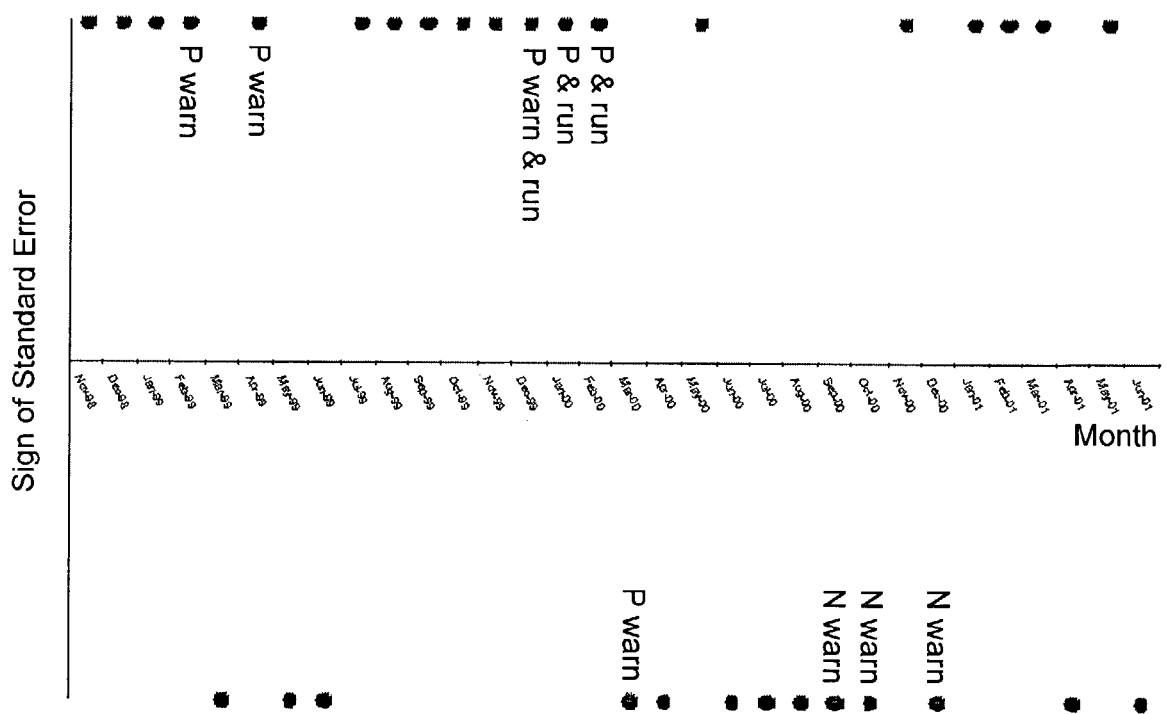
FIG. 8 is a bias indicator chart.

In some embodiments, a bias indicator chart is computed as follows. For each month of history, the bias chart plots the sign of the forecast error (+/−). We can roughly assess whether there is a bias, by looking to see if the points are balanced above and below the x-axis or not. If all points are either above or below the x-axis, then some bias most likely will show up using the bias tests described in this section. In FIG. 8, the results of these more rigorous statistical tests are posted for each month next to that month on the chart.

2.4.1 Calculating Bias

The bias indicator chart uses two simple but powerful statistical tests: the count test, and the run test. The count test measures the sign of the forecast error, and the run test corrects for short-term historical bias that can be induced by the count test.

2.4.1.1 The Count Test

Count test measures only the sign of the forecast error, but not the magnitude. Any forecast greater than actual is noted as a positive, and any forecast less than actual is noted as a negative. If the forecast is truly unbiased, then over time we would expect to see approximately the same number of positive and negative errors. In this regard, the number of positive forecast errors is compared to the total number of both positive and negative errors. If the forecast is unbiased, then the probabilities for both a positive and a negative error should be 50%. Consequently, the number of positive errors for an unbiased forecast will follow a binomial distribution with parameters of 0.5 and 0.5. Thus, in some embodiments, this distribution is used to determine whether the number of positive errors that we have observed is most likely due to random chance or whether it represents an actual bias.

The robustness of the count test comes from two things. First, because the count test uses only the sign of the errors and not their magnitude, it is not overly sensitive to one or two outlying points. Furthermore, the count test does not require underlying assumptions about the distribution of the forecast errors.

2.4.1.2 The Run Test

The count test, despite its robustness, does have a weakness: a forecast can seem to correct itself when in fact this false correction is only due to the use of a short term historical viewpoint. Consider the following example. Suppose a product has been in existence for 10 months. Every single month, we have over-forecasted, for 10 months in a row. The count test will clearly indicate a forecast bias. However, then suppose we under-forecast for the next six months in a row. Depending on the amount of history we use, the count test is very likely to report that the forecast is no longer biased, when in fact, a bias still exists.

The run test is calculated as follows:
a) Calculate the RunsControlLimit
  i. x=1
  ii. While $0.5^{(x-1)} \geq 0.05$
    x=x+1
  Wend
  iii. RunsControlLimit=x
b) At every period, count the number of consecutive positive (or negative) errors since the last negative (or positive) error. If this number is greater than the RunsControlLimit, plot a "run" on the bias indicator chart.

2.4.1.3 Confidence Coefficients

In some embodiments, "confidence coefficients" are specified for the bias chart to set outer and inner control limits on the number of positive errors (in this case, for the past 8 months). In the illustrated embodiment, the following confidence coefficients are specified:

A "confidence coefficient," equal to one minus the probability of a type I error, applied to both the count and the run test.

A "warning confidence coefficient" of 75% for the count test. This means that at this point, we think the forecast might be biased but we are not ready to declare a bias yet.

The confidence coefficient, loosely defined, is a measure of how confident we can be that a declaration of bias is accurate. In other words, if we conclude that our forecasts are biased, how confident are we that this "bias" is not just due to random chance? Setting this coefficient higher or lower has certain trade-offs. With a higher confidence coefficient, we are less likely to have a false positive, and declare bias where there is none. However, a higher confidence coefficient also increases the risk that we will conclude that a forecast is not biased when it really is biased (a false negative). For small sample sizes, however, a high confidence coefficient keeps us from concluding anything until we have more observations.

Some embodiments use a rolling history of 8 months over which to apply the count test. This is enough to get a reasonable picture of bias, while still evaluating the forecaster on recent performance rather than old data. As before, with less than eight months of history, the entire product history may be used. With these confidence coefficients, conclusions typically should not be drawn on bias with less than five observations (months).

2.4.2 Interpreting the Bias Chart

The interpretation of the bias chart of FIG. 8 is as follows:
For each period, a dot appears either above or below the zero line to show the sign of the forecast error. There is almost certain to be one, given the inherent variability in actuals at any given point in time.

If the indicator has the word "warn" next to it, that means that we have met the "warning confidence coefficient" but not the full confidence coefficient. If you see a warning, you should pay close attention to the forecasts over the next few periods, but not necessarily take action until that bias is confirmed.

If there is definitely a bias, an "N" next to the dot signifies a negative bias while a "P" signifies a positive bias. As soon as you see a definitive declaration of bias, you should consider taking corrective action to re-tune the forecasting process.

If the indicator has the word "run" next to it, that means that it is the run test that indicates a bias.

2.4.3 The Value of the Bias Chart

Assessing the value of the forecast bias chart itself is more difficult to answer than the question of whether forecast bias exists. The value of the forecast bias is mostly a qualitative assessment as it pertains to all the process factors that generated the forecast. As an initial estimation of the forecast bias, we can use the average forecast error for the last 7 periods. We stress again that this assessment is only an estimation of the forecast, and should not be treated as the "absolute" declaration of bias with some statistical significance. After we have an initial estimation of the bias, we can develop future forecasts taking this "bias" into account in some way.

2.5 Using the Metrics

Forecasters may apply each of the above-described metrics to their forecasts, and then review the results to determine the "state" of their forecast.

2.5.1 Assess Error Variability

Figures 9, 10:
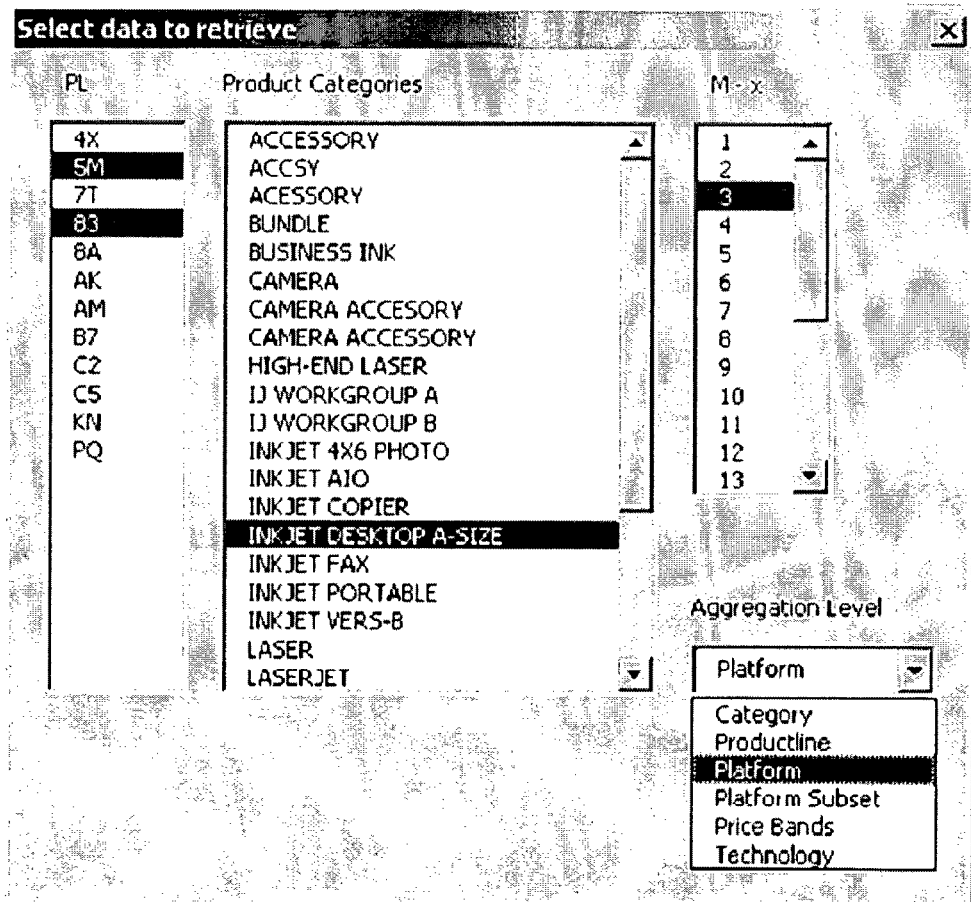
FIG. 9 is a forecast state table displayed along dimensions of forecast quality and forecast error variability.
FIG. 10 is a graphical user interface through which a user may select the data to be retrieved by the metrics calculation engine of FIG. 2.

Referring to FIG. 9, in some embodiments, a forecast may be assessed along two dimensions: forecast quality and forecast error variability. In some cases, after the error variability is calculated, the table of FIG. 9 may be used to determine whether the overall state of the forecast requires immediate attention. If the error variability is over acceptance limits, the forecast typically already is at risk and requires immediate attention.

2.5.2 Assess Bias and Control

If the forecast error variability is within the acceptance limits, the bias and control may be checked.

The table of FIG. 9 is coded as follows:

"Good" means the forecast is in a good state.

"At Risk" means that the forecast at risk and requires attention.

"Critical" means the forecast is in a critical state and requires immediate attention.

The Good, At Risk, and Critical codes in the table of FIG. 9 correspond to the codes G, Y, and R in the corresponding table in FIG. 4.

2.5.3 Forecast Quality: Bias and Control

Regarding forecast quality, in the illustrated embodiment there are four forecasting "states" that may occur, in order of most desirable to least desirable:

1. No bias, in-control
2. Bias, in-control
3. No bias, out-of-control
4. Bias, out-of-control State 1: No Bias, In-Control Forecasts are not biased and variability is not getting worse. This is the goal for all products at both a regional and a worldwide level, assuming that the variability in the forecast is acceptable to the business or is approaching the practical limit. However, even in this ideal state, you may still realize some gains through forecast improvement activities.

One area of potential improvement lies in adding a practical limit to your error control limits on the error control chart. The error control limits are set based on past forecast performance. If the past forecast performance is poor, then the control bands will be large; as long as performance does not worsen, the error control chart will read as being "in-control." This is where the practical limit on the Forecast vs. Actual chart may be used in the error control chart as well. This limit represents the level of variability as measured by the standard deviation of the percent error within which you can only expect marginal returns from further forecasting improvement. Continued investment in trying to improve the forecasting process below this limit is no longer worth the return. However, if the forecasting process state is no bias, in-control, but the variability, is still above the practical limit, you must decide whether this variability is acceptable to your business and invest accordingly.

State 2: Bias, In-Control

In this state, the forecast is biased, but not out of control, meaning the magnitude of the errors is not necessarily all that large—at least, not relative to past performance. Since variability is low, it should be easy to adjust the forecast to compensate for the small bias. You should still investigate the cause of this bias and eliminate the bias, if possible.

State 3: No Bias, Out-of-Control

The forecast error is unusually large relative to past performance, but it is not biased. Probably something has changed for the worse in the forecasting process, such as a missed promotion or deal.

State 4: Biased, Out-of-Control

This is the worst state that a forecast can be in. The forecast is both biased and exhibiting more variability than it did in the past. There typically are two ways in which this state can occur:

In the first scenario, the forecast errors are consistently biased and large. Because the errors are consistent, that is, little variability, the error control bands are somewhat narrow. However, these error control bands are centered around zero, because the error control chart by itself assumes an unbiased forecast. Therefore, these errors would be expected to fall outside the error control limits. Because the bias is consistent, it should be relatively easy to adjust the forecast to compensate for the errors.

In the second scenario, the errors are biased and variability is increasing. The fact that the most recent errors are unusually large indicates that the forecasting process has changed significantly for the worse—this in addition to a systematic bias. Considerable effort should be made to correct this forecast.

In either case, any time a forecast is both biased and out of control, causes should be investigated.

3 Strategic Level Forecast Metrics

In some embodiments, after running the metrics on each individual forecast, the results are summarized in an overview table. This table serves as quick reference to indicate individual product forecasts that need attention. The individual forecast metrics also may be used to compute the summary-level or strategic level forecast metrics. We refer to the strategic level forecast metrics as portfolio metrics, because they are applied at an aggregate level (e.g., product line). Portfolio forecasting metrics may be used for assessing the overall health of the forecasting process, and is done for general categories such as an entire product line or a region. The reason for having portfolio metrics is to reduce complexity for management. As explained above, in some embodiments, the operational-level metrics include four indicators, each of which requires a separate chart. This translates into four metric charts for each original product forecast. Forecasters sometimes have to forecast hundreds of individual products (SKUs). For example, for 100 products, a manager could have to look at over 400 metric graphs in order to assess the forecasting process on a detail level. This can become overwhelming. The strategic level forecast evaluation helps managers and forecasters to quickly identify products that need attention. They are actionable in the sense that managers should be able to initiate further investigation into problem areas by reviewing the operational metrics for individual products.

3.1 User Inputs

As shown in FIG. 10, in some embodiments, a user may filter data along the following vectors:

User Selection

The user can choose one or multiple product lines ("PL"). The selection can be filtered by product market categories ("Product Categories").

Time Horizon: M–x

This input determines the time horizon the forecast is measured for. M–3, for example, calculates the forecast error for the current month made 3 months ago, M–1 calculates the forecast error for the current month made last month, etc.

Aggregation Level

The above selection criteria determine the set of data that will be pulled from the database. The aggregation level input determines the level of aggregation for which the portfolio metrics are being calculated.

After pulling the data, the metrics calculation engine 34 (FIG. 1) calculates the forecasting metrics for the detailed level (product level), the aggregated level (e.g. platform level) and for the entire data set (portfolio level).

3.2 Portfolio Metrics At Most Aggregated Level

Figure 11:
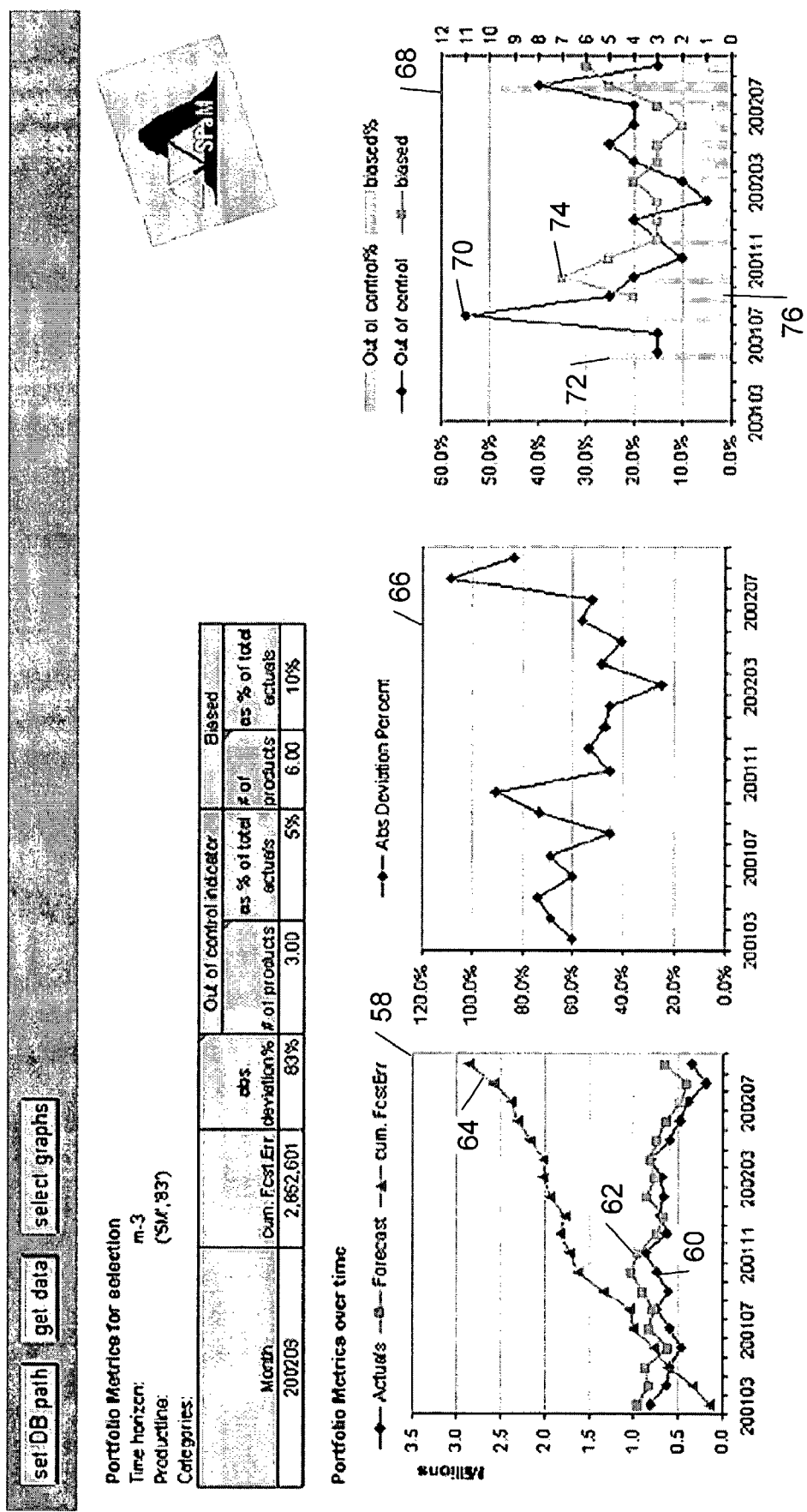
FIG. 11 is a graphical user interface displaying a forecast metrics summary table and three graphs of computed forecast evaluation metrics.

FIG. 11 shows the resulting portfolio metrics. The table contains the metrics for the current period ("200209") and is calculated based on the entire data set. The graphs show the portfolio over time, not only the current period.

3.2.1 Cumulative Forecast Error

The cumulative forecast error (cum.Fcst.Err) gives us an indication of whether we are accumulating inventory or whether we are experiencing sustained stock-outs. It is calculated by the sum of forecasted amount to date (Forecast–Actual) for each forecast period across all products in the data set. The related graph 58 (left graph) shows an actuals line 60 and a forecasts line 62 over time. The cumulative delta (forecast error) is shown as a line 64.

3.2.2 Absolute Deviation

The absolute deviation (abs. Deviation %) is the sum of absolute product forecast errors over the sum of product actuals, for the entire data set. The graph 66 in the middle shows the development of the absolute deviation over time.

3.2.3 Number of Out-of-Control Products

The number of out-of-control products graph 68 summarizes the result of the "control" chart forecasting metric run for each individual product. The control chart measures, for a particular product, how the current forecast performance (magnitude of error) compares with past performance, indicating whether the forecasts are "in-control" relative to past performance. The number of out-of-control products is absolute number of all products out-of-control in the entire data set; the percentage shows the proportion of total actual units represented by the out-of-control products.

3.2.4 Number of Biased Products

The number of biased products is the same as out-of-control products, except only measures the number of products with statistical bias. The right hand graph 68 shows the out-of-control and biased products over time. The line 70 shows the number of products out-of-control, the corresponding bar graph 72 shows the proportion of total actual represented by these products. The line 74 shows the number of biased products and the corresponding bar graph 76 shows the proportion of total actual represented by these products.

3.3 Overview Table

Some embodiments provide an easy way for forecasters to quickly identify product forecasts that are most in need of remedial attention. In these embodiments, an overview table that allows the user to quickly identify areas of concern is generated. FIG. 12 shows an example of such an overview table 78. This table shows, for the current forecast period, which products are most in need of attention. Besides reporting the individual product attributes (such as product number, platform association, etc.) the table shows the following forecast metrics:

- Actuals and forecast for the current period
- % Error (F−A)/A
- Standard deviation of forecast error
- The out-of-control column shows whether the product forecast is out of control or not (0=no, 1=yes)
- The bias column shows whether the product forecast is considered biased (0=no, 1=yes)

Note, that the cells may have conditional color-coded formats. For example, Green=within accepted limits, yellow=within warning limits, red=outside warning limits. The limits are parametric and may be set by the user.

Since we are calculating the metrics not only on the product level but on the aggregated level (platform in our example) a similar table 80 may be generated as shown in FIG. 13.

Referring to FIG. 14, in some embodiments, the forecast metrics tool provides the user with a navigation dialog box 82. In these embodiments, a user may jump directly to a desired metrics graph by clicking on an item in the list box. In the illustrated embodiment, the left hand list box navigates through the aggregated level (i.e., platform). With the right hand list box the user can select individual products.

Figure 15:
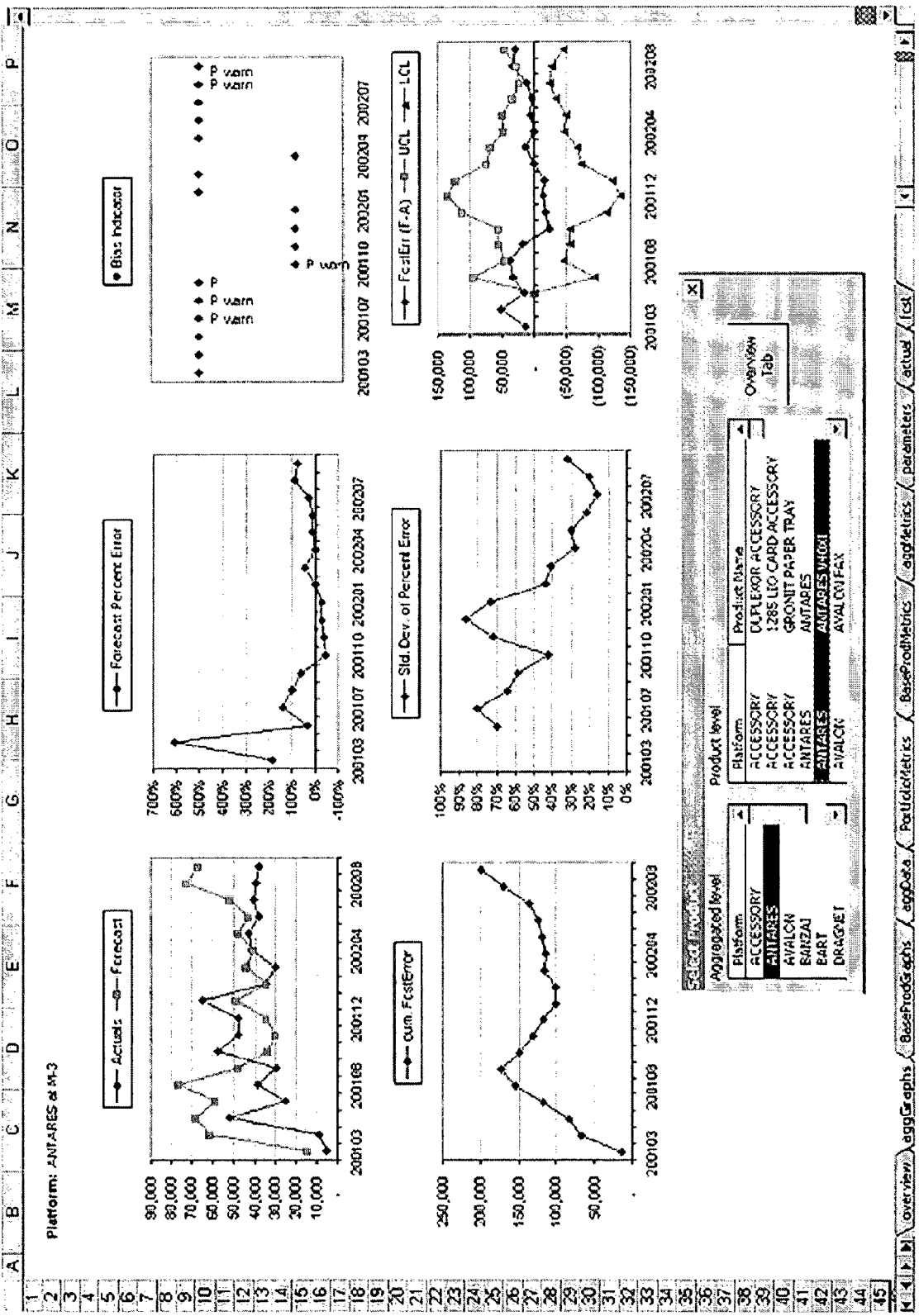
FIG. 15 is a graphical user interface displaying graphs of demand forecast evaluation metrics aggregated for a single platform.
Figure 16:
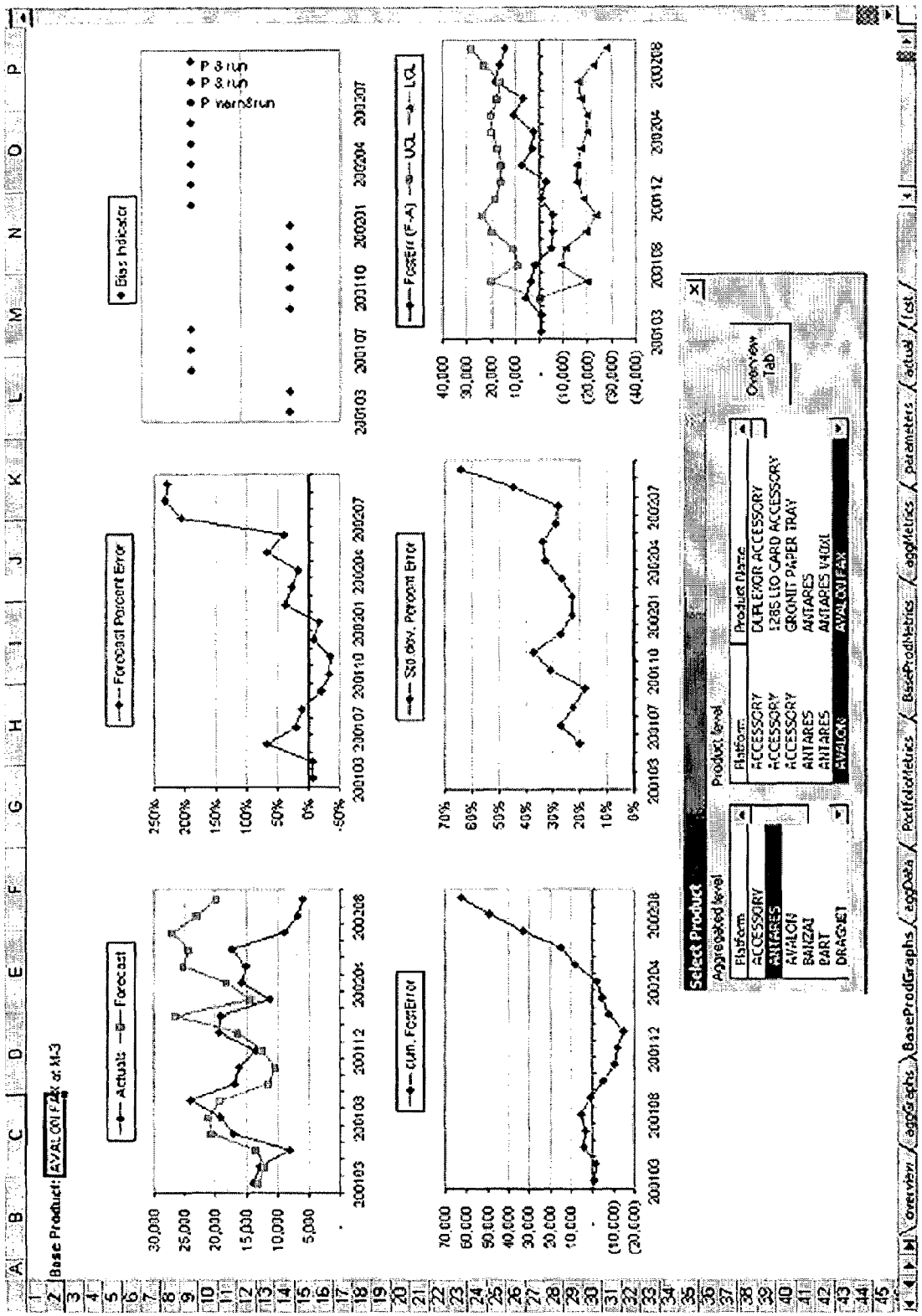
FIG. 16 is a graphical user interface displaying graphs of demand forecast evaluation metrics for a single product.

FIG. 15 shows metrics graphs for the platform "Antares" and FIG. 16 shows metrics graphs for the product "AVALON FAX," which is part of the Avalon platform in the illustrated embodiment.

The graphs shown in the graphical user interfaces of FIGS. 15 and 16 represent the following data:

- Upper-left: actuals and forecasts over time
- Upper-mid: forecast percent error (F−A)/A
- Upper-right: bias indicator chart
- Lower-left: cumulative forecast error
- Lower-mid: standard deviation of percent error
- Lower-right: error control chart

4 Other Embodiments

Other embodiments are within the scope of the claims. For example,

Although systems and methods have been described herein in the context of a particular computing environment, these systems and methods are not limited to any particular hardware or software configuration, but rather they may be implemented in any computing or processing environment, including in digital electronic circuitry or in computer hardware, firmware or software.

APPENDIX A

Metrics Calculation Engine Logic Flow

Output Tables Generated In The Excel/Access Metrics Tool
    Actuals and forecast over time
    Percent error over time (minus % error over time)
    Acceptance limits and variability
    Bias indicator Key Steps (To Generate The Outputs For Each Section)
    Control Parameters
    Define length of desired past history
    "Define statistical reference data (significance levels, etc.)"
    Create logic to address corner cases (when number of observations is less than desired n)
    Define control limits for the bias indicator (%)
    Define key elements of fundamental logic/analysis approaches
    Define the aggregation logic for pooling of multiple products Common Activities
    Pull data from APO database
    Apply the aggregation logic to calculate the pooled results for multiple products/product families/etc. (in excel/calculation engine)

Actuals and forecast over time
    Address corner cases (when number of observations is less than desired n)
    Pull data from APO database Percent Error Over Time (Minus % Error Over Time)
    Address corner cases (when number of observations is less than desired n)
    Pull data from APO database
    Calculate errors using data from database (decide whether to include this in the database or in the calculation engine)

Acceptance Limits and Variability
    "Smooth all of the existing history of actuals for all products (currently done in the database—faster, better access to data)"
    "Calculate the standard deviation of the smoothed sequence (currently done in the database—faster, better access to data)"
    Pull data from APO database
    Calculate the variability of the forecast error for each product (currently in excel (calculation engine))

Bias indicator
    Calculate the sign of the errors (in excel/calculation engine)
    Calculate the bias indicator thresholds in units and in positives and negatives (using the control limits %—in excel/calculation engine)
    Create the output used to create the charts (heavily excel-based—need to tailor a solution for APO—graphical output)
    Create and apply the logic to test for count and run results

APPENDIX B

Metrics Calculation Engine Excel® Code

```
Option Explicit
Option Base 1
Function STDEVF(a)
Dim P1 As Single
Dim P2 As Single
'Enable continuous calculations by excel
Application.Volatile
'Percentile function—determines 25th and 75th percen-
tiles of the forecast distribution
"P1=Application.Percentile(a, 0.25)"
```

"P2=Application.Percentile(a, 0.75)"
'Calcuates robust standard deviation based on interquartile method
    STDEVF=(P2−P1)* 0.74
    End Function
"Function BiasControlLimits(n, conf)"
'This function calculates the control limits for the bias control chart
'given the selected confidence level and number of past observations.
'The values are made to be non-integer so that
'no points will fall exactly on the control limits on the chart.
    Dim temp(2) As Variant
    'Array holding the results.
    "Dim alpha As Double, x As Integer"
    alpha=(1−conf)/2
'"Use cumulative binomial distribution, not probability density function"
    "If Application.BinomDist(0, n, 0.5, True)>alpha Then"
    "temp(1)=""n/a"""
    "temp(2)=""n/a"""
    Else
    x=n
    "While Application.BinomDist(x, n, 0.5, True)>alpha"
    x=x−1
    Wend
    temp(1)=x+0.5
    temp(2)=n−x−0.5
    End If
    'Function provides an array as output
    BiasControlLimits=temp
    End Function
    Function RunsControlLimit(conf)
    'This function calculates the number of consecutive positives or negatives
    'necessary to indicate a biased run (based on the selected level of confidence)
    "Dim alpha As Double, x As Integer"
    alpha=(1−conf)
    x=1
    While 0.5 ^(x−1)>=alpha
    x=x+1
    Wend
    RunsControlLimit=x
    End Function

APPENDIX C

Metrics Calculation Engine Access® Database Code
Option Explicit
Option Base 1
Option Compare Database
Function GenerateAcceptanceLimits( )
'Dimension variables
Dim DB As Database
Dim RS As Recordset
Dim RSOUT As Recordset
Dim Tout As TableDef
Dim PreviousProduct As String
Dim a As Double
Dim sx2 As Double
Dim sx As Double
Dim X As Double
Dim n As Integer
Dim i As Integer
Dim Table( ) As Single
Dim SmoothedTable As Variant
    Set DB=CurrentDb
    'Deletes previous version of table
    On Error Resume Next
    "DB.TableDefs.Delete ""ProductAcceptanceLimits"""
    On Error GoTo 0
    'Create table and add fields
    "Set    Tout=DB.CreateTableDef(""ProductAcceptance-Limits"")"
    With Tout
    ".Fields.Append .CreateField(""Product"", dbText)"
    ".Fields.Append .CreateField(""Ndata"", dbLong)"
    ".Fields.Append .CreateField(""Mean"", dbDouble)"
    ".Fields.Append .CreateField(""StDev"", dbDouble)"
    ".Fields.Append .CreateField(""COV"", dbDouble)"
    End With
    'Move the table from memory to the file
    DB.TableDefs.Append Tout
    'Generate the set of records
    Set RSOUT=Tout.OpenRecordset
    "Set RS=DB.OpenRecordset(""S2WWMonthData"")"
    "PreviousProduct="""""
    n=0
    a=0.1
    'Create the data for each field for each product and calculate values to fill the data for each product
    Do While Not RS.EOF
    "If RS.Fields(""[Product]"")<>PreviousProduct Then"
    "If PreviousProduct <>"""" Then"
    SmoothedTable=Smooth(Table)
    sx=0
    sx2=0
    For i=1 To n
        sx=sx+SmoothedTable(i)
        sx2=sx2+SmoothedTable(i) ^2
    Next i
    RSOUT.AddNew
    "RSOUT.Fields(""[Product]"")=PreviousProduct"
    "RSOUT.Fields(""[Ndata]"")=n"
    "RSOUT.Fields(""[Mean]"")=sx/n"
    If (sx/n)<>0 And n>3 Then
    "RSOUT.Fields(""[StDev]"")=Sqr((n*sx2−^2)/(n*(n−1)))"
    "RSOUT.Fields(""[COV]"")=Min((Sqr((n*sx2−sx^2)/(n*(n−1))))/(sx/n), 0.6)"
    Else
    "RSOUT.Fields(""[StDev]"")=0"
    "RSOUT.Fields(""[COV]"")=0.6"
    End If
    RSOUT.Update
    ReDim Table(1)
    End If
    "PreviousProduct=RS.Fields(""[Product]"")"
    n=1
    ReDim Table(1)
    "Table(1)=RS.Fields(""[Actual Units]"")"
    Else
        n=n+1
        ReDim Preserve Table(n)
    "Table(n)=RS.Fields(""[Actual Units]"")"
    End If
    RS.MoveNext
    Loop
    RS.Close
    RSOUT. Close
    End Function
    Function Smooth(X) As Variant
    "Dim n As Integer, i As Integer"

```
Dim X1( ) As Single
Dim X2( ) As Single
Dim Y( ) As Single
n=UBound(X)
If n>2 Then
ReDim Y(n)
ReDim X1 (n-1)
ReDim X2(n-2)
For i =1 To n-1
   X1(i)=10 ^10
Next i
For i=1 To n-2
   X2(i)=10 ^10
Next i
For i=1 To n-1
   X1(i)=(X(i)+X(i+1))/2
Next i
For i=1Ton-2
   X2(i)=(X1(i)+X1(i+1))/2
Next i
Y(1)=X(1)
Y(n)=X(n)
For i=1 To n-2
   Y(i+1)=X2(i)
Next i
Smooth=Y
Else
ReDim X1(n)
Smooth=X1
End If
End Function
"Function Min(a, b)"
If a<b Then
Min=a
Else
Min=b
End If
End Function
```

APPENDIX D

Metrics Calculation Engine Functions

Excel® Functions/Capabilities
Percentile: Returns the x percentile of a range of numbers
BinomDist: Returns the individual term binomial distribution probability (cumulative distribution function, not probability mass function)"
Index Lookup/reference functionality
Min/max
Basic algebra
Pivot table functionality
Other Capabilities
Pass arrays: Pass arrays between database and calculation engine
Dynamically allocate arrays (and associated memory)
Loops: "For . . . Next, while . . . , etc."

APPENDIX E

Establishing Practical Limits for Forecast Accuracy

When developing metrics to measure forecast performance, we must first determine what is the best performance that we can reasonably expect to achieve. One approach to answering this question uses data smoothing techniques to set practical limits on forecasts, given the inherent volatility of orders.

A.1 Data Smoothing

Oftentimes, variability obscures the underlying patterns in the data. Data smoothing is a technique which allows us to see the gist of the data's content without being distracted by fluctuations from one data point to the next. One data smoothing approach combines a number of steps, including taking successive medians of nearby points, to flattening out the little peaks and valleys that result.

Data smoothing, as a technique, must be carefully distinguished from forecast creation. Smoothing is really just a way to aesthetically reduce the available data to its central essence. It's not intended to predict a value; it's really just to isolate the signal from the noise. In fact, no functional form for the smoothed fit results from the process—the only output is a new series of points to plot.

A.2 Practical Limits

In some embodiments, data smoothing is used as the first step to establish practical limits, as follows:

1. Apply the selected data smoothing approach to the history of actual orders.
2. Take this smoothed order data and treat it as if it had been the forecast.
3. Compare the errors between the smoothed data and the raw data. These errors are your noise level.

The assumption is that you would never be able to forecast actual values any better than this smoothed fit. The median and the standard deviation of these "forecast" errors can thus be viewed as a reasonable estimate of the best values one could hope to achieve through improvements to the forecasting process.

It is difficult to determine a single "practical limit" on the standard deviation that applies to all products. In some cases, there is no correlation between the volume of demand and its standard deviation. In these cases, the practical limit on the standard deviation should be set for forecast errors individually for each product.

While analytical methods may provide guidance in determining what acceptance limit is appropriate for a given business situation, some ambiguity is inevitably introduced by the level of aggregation and the business environment. We can't necessarily assume that there is a single algorithm that will work well for all businesses. Acceptance limits typically should be executive decisions made by senior managers who are already familiar with the business.

However, if it isn't feasible to do this, a single number for this practical limit may be estimated and applied it to all product forecasts within a product family. This "overall" practical limit may be harder to estimate for some products than for others, but if the forecasting and forecast evaluation processes result in a standard deviation close to this value, then we can reasonably conclude that the forecasting variability for this product is well under control.

We can also expect the standard deviation for forecast errors to be larger for individual regions than for the same product on a global level. This expected larger spread at the regional level requires practical limits that vary from region to region, and from product to product.

APPENDIX F

Robust Statistics: A Background

It seems worthwhile to review some underlying statistical principles when discussing the proposed forecasting metrics.

F.1 Describing Uncertainty

A major motivation for improving forecast accuracy is that forecasts are a key input for operations planning. Aspects of operations planning that are heavily dependent on forecasts include procurement, production schedules, production capacity, distribution, and inventory levels. In each of these areas, decisions are made partly based on expectations of what might happen, in the face of what we think is likely to happen. A good, quantitative assessment of the uncertainties in the environment is essential, and experience shows that the uncertainty of forecast error stands out for its operational impact.

Classic analytical techniques (estimating safety stocks, for example) rely on summary statistics such as mean and standard deviation to quantify uncertainty. These techniques often assume that the data is distributed according to the well-known "normal distribution." However, we must remember that technically speaking, the mean and standard deviation that we calculate from a sample are estimates of the parameters of the distribution of the entire population.

In some embodiments, the formula for the standard deviation ($\sigma$) is as follows:

$$\sigma = \sqrt{\frac{n\sum x^2 - (\sum x)^2}{n(n-1)}}$$

F.2 Outliers

The standard deviation formula of Section E1 is sensitive to one or two outlying points. This may lead to overestimating the intrinsic spread of the data.

F.3 Interquartile Spread

For this reason, in some embodiments, a more robust approach to estimating the true shape of a distribution uses percentiles in a method called the interquartile spread. The formula is as follows:

$$0.74*(P_{0.75}-P_{0.25})$$

In the above formula, $P_{0.75}$ and $P_{0.25}$ are the $75^{th}$ and $25^{th}$ percentiles respectively.

To calculate the percentiles:
1. Order the n data values from lowest to highest.
2. If n is even:
   $25^{th}$ percentile=median of the lower half of the data p=0.25
   $75^{th}$ percentile=median of the upper half of the data p=0.75
3. If n is odd:
   $25^{th}$ percentile=median of the lower "half" of the data (including the overall Median) p=0.25
   $75^{th}$ percentile=median of the upper—"half" of the data (including the overall Median) p=0.75
4. Compute n×p and round up, call this number m.
5. Use the $m^{th}$ point in order.

To find the median in an ordered set of n numbers
If n is odd, m is the middle value.
If n is even, m is the average of the two middle values.

What is claimed is:

1. A computer-implemented method of monitoring a demand forecasting process, comprising:
   computing a respective measure of demand forecast error variability for each of multiple periods of a selected time frame;
   for each of the periods, computing a respective indicator of forecast bias based on forecast error consistency over ones of the periods prior to the respective period, wherein the computing of the forecast bias indicator at each respective period comprises computing a count of consecutive positive forecast errors after a most recent negative forecast error and computing a count of consecutive negative forecast errors after a most recent negative forecast error over ones of the periods prior to the respective period;
   determining information characterizing the demand forecasting process based at least in part on the demand forecast error variability measures and the forecast bias indicators; and
   presenting the information on a display, wherein a computer performs the computing of the measures of the demand forecast error variability, the computing of the indicators of the forecast bias, and the determining.

2. The method of claim 1, wherein computing the forecast error variability measures comprises computing a measure of standard error at each of the periods.

3. The method of claim 2, wherein each of the standard error measures is computed by subtracting actual demand from forecasted demand for each of the periods.

4. The method of claim 2, further comprising dividing the standard error measures by corresponding actual demand values to obtain measures of percent error for respective ones of the periods.

5. The method of claim 4, further comprising computing respective measures of standard deviation of the percent error measures for one or more of the periods.

6. The method of claim 5, further comprising computing measures of inter-quartile spread based on the computed measures of standard deviation of percent error.

7. The method of claim 2, further comprising computing upper and lower control limits based on the computed measures of standard error.

8. The method of claim 7, wherein the upper and lower control limits are computed so that each of the computed standard error measures falls between the upper and lower control limits with a prescribed probability.

9. The method of claim 8, further comprising in each of the periods labeling the demand forecasting process as being out of control based at least in part on whether or not the computed standard error measure at that period falls between the upper and lower control limits in the respective period.

10. The method of claim 1, further comprising simultaneously displaying a computed forecast error variability measure and a selected acceptance limit value.

11. The method of claim 10, further comprising labeling the demand forecasting process with a state indicator based at least in part on whether or not the forecast variability measure is above or below the acceptance limit value.

12. The method of claim 1, wherein computing the forecast bias indicator at the given period comprises computing counts of positive and negative forecast errors at periods of the selected time frame prior to the given period.

13. The method of claim 12, wherein computing the forecast bias indicator at the given period comprises testing the counts of positive and negative forecast errors with respect to a binomial distribution with parameters of 0.5 and 0.5 to obtain a bias likelihood factor.

14. The method of claim 13, further comprising labeling the demand forecasting process with a bias indicator based on comparison of the bias likelihood factor with one or more confidence coefficients.

15. The method of claim 1, further comprising labeling the demand forecasting process with a bias indicator based on comparisons of the counts of consecutive positive and negative errors with a run control limit value.

16. The method of claim 15, further comprising labeling the demand forecasting process with a state indicator based at least in part on the bias indicator.

17. A computer-readable medium storing computer-readable instructions that, when executed by a computer, cause the computer to perform operations comprising:
- computing a respective measure of demand forecast error variability for each of multiple periods of a selected time frame;
- for each of the periods, computing a respective indicator of forecast bias based on forecast error consistency over ones of the periods prior to the respective period, wherein the computing of the forecast bias indicator at each respective period comprises computing a count of consecutive positive forecast errors after a most recent negative forecast error and computing a count of consecutive negative forecast errors after a most recent negative forecast error over ones of the periods prior to the respective period;
- determining information characterizing the demand forecasting process based at least in part on the demand forecast error variability measures and the forecast bias indicators; and
- presenting the information on a display.

18. A computer-implemented method of monitoring a demand forecasting process, comprising:
- calculating a respective value of a demand forecast error variability metric for each of multiple periods of a selected time frame, wherein the calculating comprises for each of the periods calculating the respective value of the demand forecast error variability from a respective forecasted demand value and a respective actual demand value;
- for each of the periods, ascertaining a respective indicator of forecast bias based on forecast error consistency over ones of the periods prior to the respective period;
- determining information characterizing the demand forecasting process based at least in part on the demand forecast error variability metric values and the forecast bias indicators; and
- presenting the information on a display, wherein a computer performs the computing of the measures of the demand forecast error variability, the computing of the indicators of the forecast bias, and the determining.

19. The method of claim 18, wherein the demand forecast error variability metric is a standard deviation of percent error metric, and the calculating comprises for each of the periods calculating a respective value of the standard deviation of percent error metric from the respective forecasted demand value and the respective actual demand value.

20. The method of claim 18, further comprising for each of the periods determining limit values from the respective forecasted demand value and the respective actual demand value.

21. The method of claim 20, wherein the determining comprises for each of the periods determining whether or not the demand forecasting process is in or out of control based at least in part on the limit values in the respective period.

22. The method of claim 21, wherein the limit values define a threshold on the values of the demand forecast error variability metric, and the determining of the information characterizing the demand forecasting process comprises comparing the limit values to the demand forecast error variability metric values.

23. The method of claim 21, wherein the determining of the limit values comprises calculating values of upper and lower control limits from the demand forecast error variability metric values.

24. The method of claim 23, further comprising for each of the periods determining a respective value of an error metric from the difference between the respective forecasted demand value and the respective actual demand value, and wherein the calculating of the upper and lower control limit values comprises determining the upper and lower control limit values so that the error metric values fall between the respective upper and lower control limit values with a specified probability.

25. The method of claim 18, wherein the ascertaining comprises for each of the periods identifying when the demand forecasting process is consistently higher or lower than actual demand.

26. The method of claim 18, wherein the ascertaining comprises for each of the periods determining a respective indicator of relative magnitude between the respective forecasted demand value and the respective actual demand value.

27. The method of claim 26, wherein the ascertaining comprises for each of one or more of the periods determining the respective indicator of forecast bias from a statistical analysis of ones of the relative magnitude indicators.

* * * * *